United States Patent [19]

Kalsi et al.

[11] 4,176,292

[45] Nov. 27, 1979

[54] AUXILIARY FIELD WINDING FOR A SUPERCONDUCTIVE ALTERNATING CURRENT ELECTRICAL MACHINE AND METHOD OF EXCITING SAME

[75] Inventors: Swarn S. Kalsi, Clifton Park; Madabushi V. K. Chari, Schenectady, both of N.Y.

[73] Assignee: Electric Power Research Institute, Inc., Palo Alto, Calif.

[21] Appl. No.: 830,155

[22] Filed: Sep. 2, 1977

[51] Int. Cl.² ............................................. H02K 9/00
[52] U.S. Cl. .................................. 310/52; 310/68 R; 310/261
[58] Field of Search ................. 310/10, 40 R, 52, 165, 310/264, 265, 68, 261

[56] References Cited

U.S. PATENT DOCUMENTS

| | | | |
|---|---|---|---|
| 3,644,766 | 2/1972 | Hughes | 310/165 |
| 3,809,933 | 5/1974 | Sugawara | 310/10 |
| 3,916,229 | 10/1975 | Litz | 310/52 |
| 3,934,163 | 1/1976 | Mailfret | 310/10 |
| 3,983,427 | 9/1976 | Ulke | 310/40 R |
| 3,991,333 | 11/1976 | Laskaris | 310/52 |
| 4,034,245 | 7/1977 | Mailfret | 310/52 |
| 4,058,746 | 11/1977 | Mole | 310/10 |
| 4,060,743 | 11/1977 | Weghaupt | 310/10 |

OTHER PUBLICATIONS

Boyer et al., "Superconducting Three Element Synch. A.C. Machine", IEEE Trans. on Magnetics, vol., Mag. 11, No. 2, 3/75, 646-649.

Primary Examiner—R. Skudy
Attorney, Agent, or Firm—Flehr, Hohbach, Test, Albritton & Herbert

[57] ABSTRACT

An auxiliary field winding for a superconductive AC electrical machine. The auxiliary field winding is adapted to provide a controlled and rapidly varying magnetic field to an armature winding in addition to that produced by the main field winding for improving the dynamic stability of the machine. The main field winding is superconductive and is adapted to provide a substantially steady-state magnetic field to the armature. The two windings permit the machine to rapidly accommodate changes in the load made on the machine during operation.

14 Claims, 6 Drawing Figures

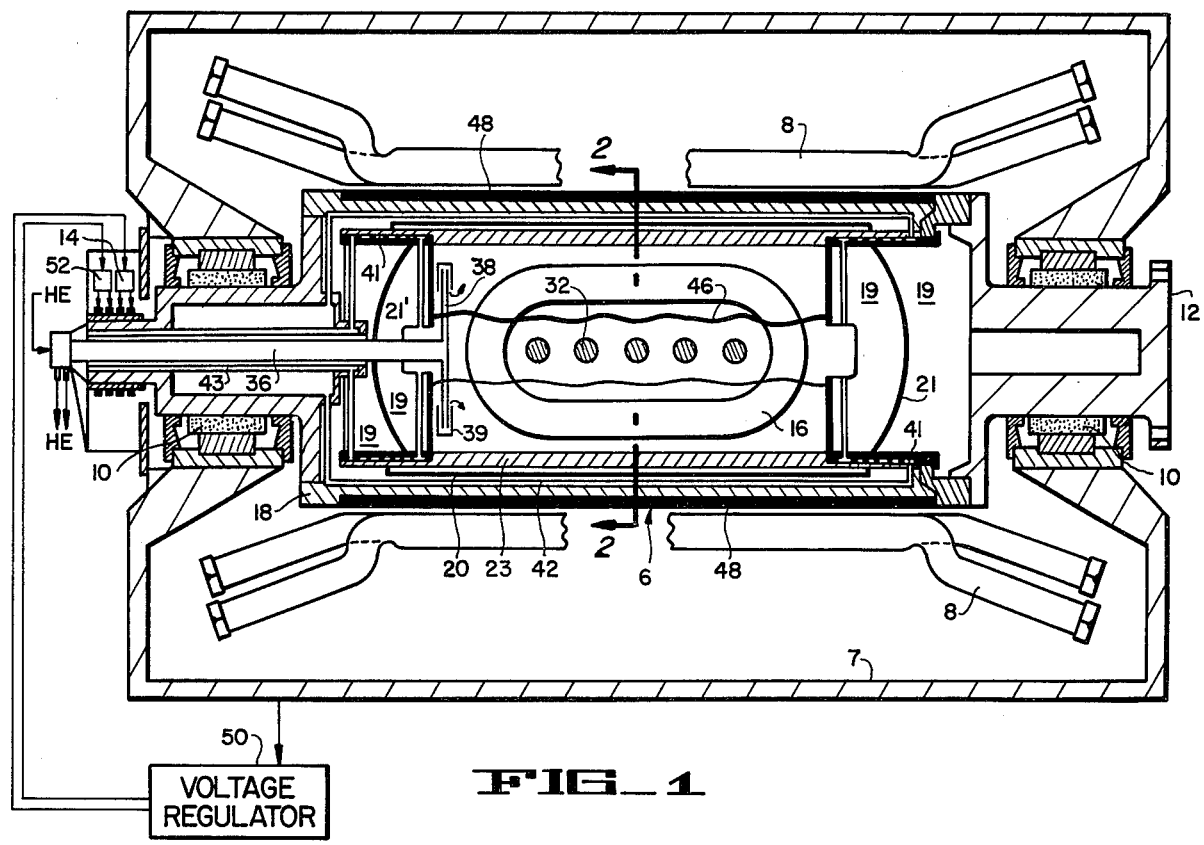
FIG_1
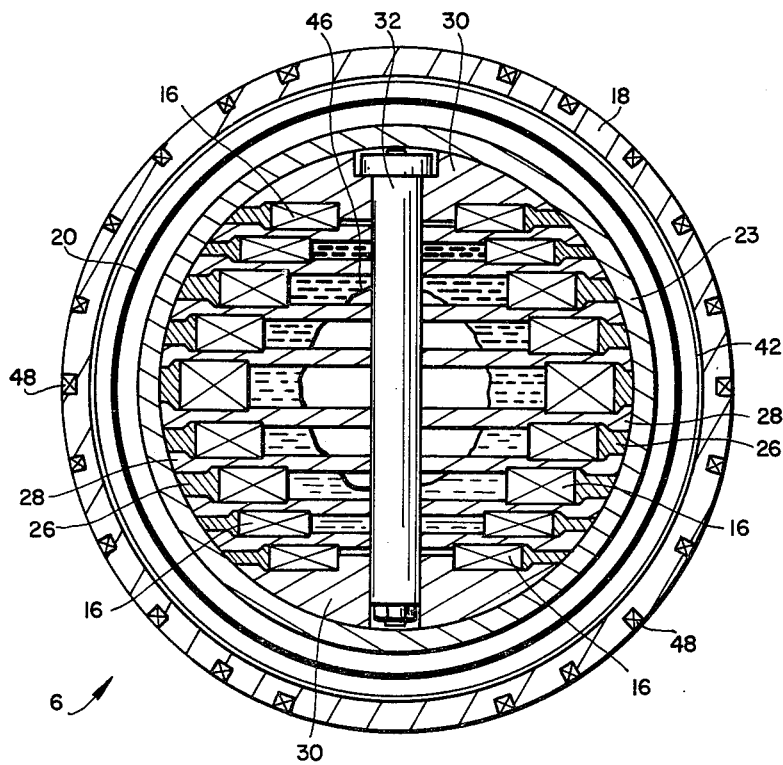
FIG_2

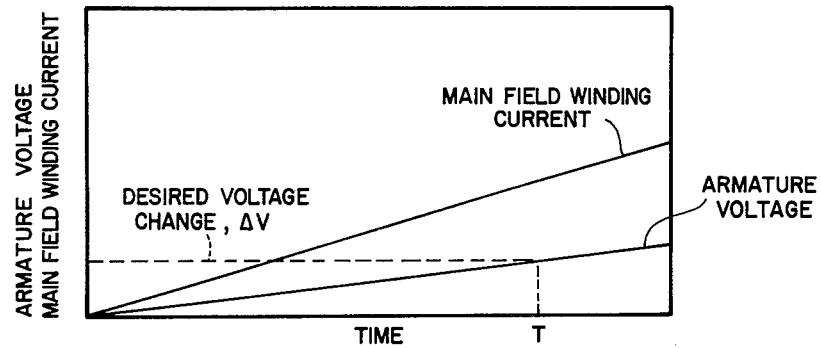
FIG._3
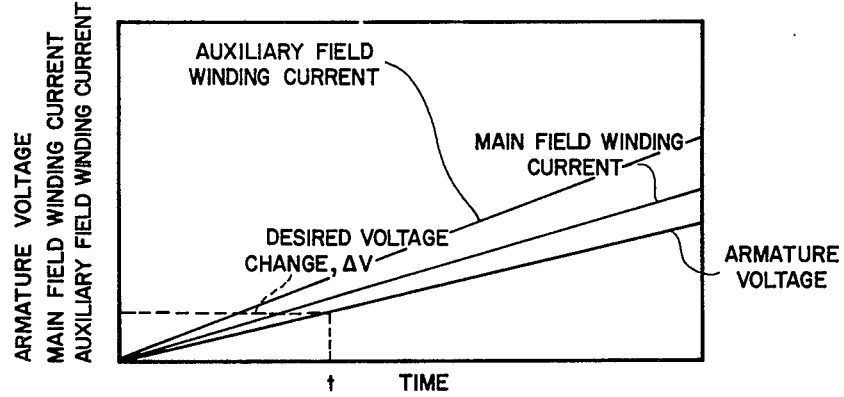
FIG._4
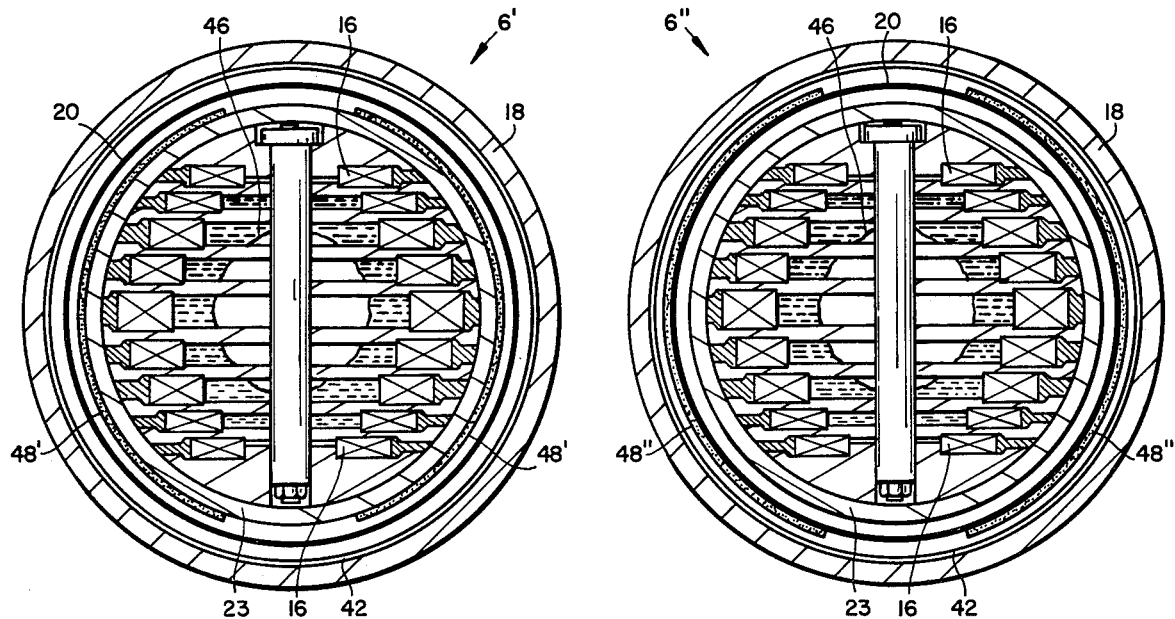
FIG._5  FIG._6

AUXILIARY FIELD WINDING FOR A SUPERCONDUCTIVE ALTERNATING CURRENT ELECTRICAL MACHINE AND METHOD OF EXCITING SAME

BACKGROUND OF THE INVENTION

This invention relates to alternating current, superconductive electrical machines and, more particularly, to the field windings used in both generators and motors of this type.

The windings used in AC electrical machinery can be classified in two groups: armature windings and field windings. An armature winding is the main current-carrying winding in which the electromotive force is induced. The current in the armature winding is known as the armature current. A field winding is the winding that produces the magnetic field in the machine. The current in the field winding is known as the field or exciting current.

The armature winding in AC synchronous motors and generators is normally constructed on a stator, and the field winding is in the rotor. However, in special cases, the armature winding could be located on the rotor and the field winding can be on the stator.

To describe the environment of the present invention, one example of a superconductive AC machine is illustrated in FIG. 1. This machine is an alternating current, synchronous generator having two poles and a superconductive main field winding. In one design the machine has a capacity of 1200-MVA with an output of 23.5-KV at 3600-RPM. This machine is adapted for connection to a public utility power system.

The AC generator of FIG. 1 includes a rotor 6 that is supported by two bearings 10 in a housing 7. The rotor turns within the stator bars 8 that constitute the armature winding. The rotor is turned by a turbine (not shown) attached to the coupling 12. The field winding in the rotor is energized through the exciter 14.

The rotor 6 contains a superconductive field winding 16 which is cooled to the liquid helium operating temperature of 4.2° K. The winding is housed within an electromagnetic shield 18 that also serves as a vacuum envelope for the winding. The interior of the rotor at points 19 is permanently evacuated in order to insulate the rotor from other components of the generator operating at ambient temperatures. The electromagnetic shield screens the superconducting winding from non-synchronous components of the magnetic field produced by unbalanced or transient currents in the stator 8. Inside of the electromagnetic shield is a thermal radiation shield 20 which intercepts thermal radiation from the ambient temperature electromagnetic shield 18. The winding 16 is also protected at its ends by two thermal radiation shields 20, 21'.

Inside of the shields is a torque tube 23 which transmits torsional forces from the field winding 16 to the turbine coupling 12. The torque tube is illustrated in FIG. 2 in end elevation. Although different schemes for supporting the field winding are available, the apparatus shown in FIG. 2 has a field winding which consists of many winding modules. In particular, the torque tube houses nine superconductive winding modules 16. Each superconductive winding module is ractrack shaped, FIG. 1, and is manufactured from niobium-titanium filaments. Each winding module is supported in the torque tube by an outer housing 26, a series of support plates 28, and two aluminum pole segments 30, FIG. 2, located at opposite ends of the winding stack. The assembly of winding modules 16, housings 26, support plates 28, and pole segments 30 is fastened together by cross bolts 32 located along the longitudinal axis of the rotor. This assembly is inserted into the cylindrical torque tube 23 and is held in place by a plurality of keys (not shown). The torque tube is fabricated from a nonmagnetic steel such as either an FeNiCr-base austenitic stainless steel or a nickel-base stainless steel.

Referring to FIG. 1, the field winding 16 is cooled by the flow of liquid helium through the rotor. Saturated liquid helium is delivered to a central supply tube 36 from a liquefier or supply dewar (not shown). The liquid helium flows along the axis of rotation of the rotor into the torque tube 23. The liquid helium is distributed in the rotor by a radial supply tube 38 and a level control monitor 39. When the rotor 6 turns, centrifugal force causes the liquid helium to assume the shape of a cylinder. The lighter weight helium vapor becomes centered about the axis of rotation of the rotor, FIG. 2, and the interface between the liquid and the vapor is indicated by reference numeral 46.

During operation of the generator the liquid helium boils as a result of the heat transferred into the cold region of the rotor. Two separate streams of boiled-off vapor are removed from the rotor. One stream passes through a series of spiral flow channels 41, then through passage 42 that runs across the inner side wall of the electromagnetic shield 18, and thereafter through the exhaust tube 43 which is concentric with the central supply tube 36. The other stream of vapor passes through a second plurality of spiral flow channels 41 which also connect to the concentric exhaust tube 43. The warm helium vapor thereafter flows out of the generator and is returned to the liquefier (not shown).

When the field winding 16 is cooled to a temperature of approximately 4.2° K., the winding modules become superconductive. At this temperature the winding is non-resistive. However, the circuit that excites the field winding has some electrical resistance from the exterior leads to the generator and the field current power supply. Thus, the field winding circuit has a very large but finite time constant. As used herein the time constant of the field winding is the ratio of the self-inductance of the field winding to the resistance of the field winding circuit.

When the generator is connected to an electrical power distribution system such as a public utility, the generator must operate in synchronism with the other machines and loads in the system. The superconductive generator must accommodate for changes in the electrical load as rapidly as possible and in coordination with the other machines in the system. Generally, the active portion of the electrical load is accommodated by varying the mechanical power supplied to the generator from the turbine (not shown). The reactive power demand on the generator is satisfied by altering the excitation to the field winding.

Heretofore, one problem with superconductive machines and, in particular, superconductive AC generators, has been the inability to rapidly accommodate for changes in the load. The large time constant of the superconductive field winding prevents the field current from being instantaneously changed to match the electrical load placed on a generator. If the electrical load is not quickly matched by the output of the generator, the generator begins to oscillate and, if the condition is permitted to continue, the generator becomes dynamically unstable.

In the past large exciter voltages have been used on superconductive field windings in an attempt to change the field current rapidly. To obtain these large voltages, a large capacity exciter, one capable of handling very high voltages, has been used. These exciters are both costly to construct and difficult to maintain. In addition, the use of large exciter voltages has been constrained by the dielectric strength of the field winding insulation. Until now, the dielectric strength of the insulation has limited the magnitude of the voltage that can be impressed on the main field winding because the peak voltage is governed by the value of discharge resistor connected across the field winding terminals. Further, the dielectric strength of the insulation has also limited the rate at which changes in the excitation current can be made because the field winding terminal voltage is proportional to the time rate of change of the field winding current.

SUMMARY OF THE INVENTION

The primary object of the present invention is to overcome the limitations and disadvantages of the prior art.

An additional object of the present invention is to assist the main field winding in a superconductive electrical machine in accommodating rapid changes in the load placed on the machine during operation.

A further object of the present invention is to facilitate changing the magnetic field in a superconductive electrical machine.

Another object of the present invention is to damp-out any low frequency oscillations of the rotor in a superconductive AC generator.

Still another object of the present invention is to limit the armature terminal voltage in a superconductive AC generator following a sudden loss of the load.

These and other objects are achieved by an auxiliary field winding adapted to provide a controlled rapid variation of the magnetic field in a superconductive AC electrical machine. The auxiliary field winding operates in cooperation with the main field winding which provides a substantially steady-state magnetic field to the armature in the machine. The main field and auxiliary field windings are supported in the machine so that the two windings can rapidly accommodate changes in the load made on the AC machine during operation.

Additional objects and features of the invention will be clear from the following description in which the preferred embodiments have been set forth in detail in conjunction with the accompanying drawings.

BRIEF DESCRIPTION OF THE DRAWINGS

FIG. 1 is a side elevation, in section, of a superconductive electrical generator according to the present invention.

FIG. 2 is an end elevation, taken in section along line 2—2 of FIG. 1 of the rotor of the generator of FIG. 1. The rotor of FIG. 2 is also rotated 90° about its principal axis from the rotor illustrated in FIG. 1.

FIGS. 3 and 4 are graphs plotted against time of the armature voltage, the main field winding current, and the auxiliary field winding current to the present invention.

FIG. 5 is an end elevation, in section, of an alternative embodiment of the present invention. In this embodiment the auxiliary field winding is positioned on the torque tube of the rotor.

FIG. 6 is an end elevation, in section, of a second alternative embodiment of the present invention. In this embodiment the auxiliary field winding is mounted on the thermal radiation shield of the rotor.

DESCRIPTION OF THE PREFERRED EMBODIMENTS

FIGS. 1 and 2 illustrate one embodiment of the present invention as incorporated in a superconductive alternating current generator. The major components of this generator and their functions have been described in detail above. The generator includes a rotor 6 that houses the main field winding modules 16. The field winding modules are mounted within a torque tube 23 using the support plates 28, the winding housings 26, and the pole segments 30, and the cross bolts 32. During operation both the main field winding 16 and the torque tube 23 are cooled to a temperature of about 4.2° K. by a flow of liquid helium through the rotor. The main field winding at this temperature becomes superconductive and has zero electrical resistance.

The torque tube 23, FIG. 2, is surrounded by a cylindrical thermal radiation shield 20 which is cooled to an intermediate temperature of between 80° K. and 100° K. This shield is an actively cooled reflective surface that receives radiation from the ambient temperature and re-radiates from an intermediate temperature (80° K. to 100° K.) to the liquid helium temperature rotor region. The active cooling removes the heat corresponding to the difference between absorbed and re-radiated thermal radiation. The thermal radiation shield is cooled by conduction from the ends of the cylinder. The shield is fabricated from a thermally and electrically conductive material such as 6061T6 Aluminum.

The torque tube 23, FIG. 2, and the thermal radiation shield 20 are surrounded by a cylindrical electromagnetic shield 18. The electromagnetic shield screens the main field winding 16 from steady-state negative sequence magnetic fields and from asynchronous fields produced by the armature 8, FIG. 1. This shield also protects the rotor from crushing loads caused by the electromagnetic field during a fault. Such forces are developed, for example, during a short circuit fault condition across the three phases of the generator output. The electromagnetic shield can be fabricated from either an alloy of the 2,000, 6,000, or 7,000 series, heat-treatable aluminum or a precipitation-hardenable alloy such as Monel alloy K-500 or Inconel alloy X-750.

The auxiliary field winding 48, FIG. 2, is embedded in slots cut into the exterior surface of the rotor 6 proximate to the stator 8, FIG. 1. The auxiliary field winding is fabricated from a plurality of individual coils that are form-wound with several turns per coil. Each coil is fabricated using commercially available, insulated, rectangular copper wire. The auxiliary field winding has a substantially smaller time constant than the main field winding 16. For a typical 1200-MVA generator the auxiliary winding can be operated at an average current density of 1,000 amps per square inch. The dimensions of each coil in the auxiliary field winding are selected to provide a suitable spacial distribution of the magnetic field across the armature 8, FIG. 1. In the preferred embodiment cylindrical construction of the auxiliary field winding is employed so that the coils are embedded in the slots in a series of the elongated concentric loops. Each coil is held in its slot by a wedge (not shown). The ends of each coil are held in place against mechanical forces by suitable end-rings or by epoxy impregnated glass fibers.

The auxiliary field winding 48, FIG. 2, is located on the exterior surface of the rotor 6 and is maintained at ambient temperature for several reasons. In this position the auxiliary field winding is more closely coupled to the armature winding 8, FIG. 1, and therefore, a relatively small excitation current is required for the auxiliary field to produce a desired change of voltage in the armature winding. Also, any reaction current induced in the main field winding by changes in the auxiliary field current is small because mutual coupling between these two windings is weak. By designing the auxiliary field winding to operate at ambient temperature, the problems of cooling the winding with either liquid helium or liquid nitrogen are also avoided.

The terminal voltage of the superconductive generator is monitored by a voltage regulator 50, FIG. 1. The voltage regulator is of known construction and controls the excitation current to the auxiliary field winding 48 as well as to the main field winding 16. The voltage regulator maintains the terminal voltage of the generator constant irrespective of changes in either the load current in the power distribution system (not shown) or the supply voltage. The voltage regulator excites the auxiliary field winding 48 through a low voltage exciter 52, FIG. 1, and the main field winding 16 through the main exciter 14.

In operation, the voltage regulator 50, FIG. 1, excites the auxiliary field winding 48 to make up the difference between the magnetic field required by the armature 8, FIG. 1, to meet the instantaneous load placed on a machine and the magnetic field supplied by the main field winding 16. Normally, the auxiliary field winding provides only a small fraction of the total excitation and this fraction is supplied on a transient basis.

FIGS. 3 and 4 illustrate the comparative operation of the auxiliary field winding 48. When the main field winding 16 alone is excited, the desired terminal voltage change $\Delta V$ is obtained in T seconds as illustrated in FIG. 3. In contrast, when the auxiliary field winding is excited along with the main field winding, the desired voltage change $\Delta V$ is obtained in a much shorter time, t seconds, as illustrated in FIG. 4.

Normally, the voltage regulator 50 excites the auxiliary field winding to provide rapid changes in the air-gap flux density between the rotor 6 and the armature 8, FIG. 1. The main field winding provides a substantially steady-state magnetic field and the auxiliary field winding provides a controlled and rapidly varying magnetic field to the armature when quick changes in field flux are necessary. However, if the load on the generator is gradually changed over a long period of time, the main field winding excitation is slowly varied by the voltage regulator 50 to match the new condition of loading. In all cases, however, the auxiliary field and the main field windings cooperate to provide the magnetic field required by the armature to meet the instantaneous load placed on the machine.

It should be noted that the design of the auxiliary field winding is quite general and is not restricted to a particular method of manufacturing the main field winding.

If the load on the machine is suddenly lost, the voltage regulator 50, FIG. 1, excites the auxiliary field winding in order to limit the armature terminal voltage. This is done by exciting the auxiliary field winding such that it opposes the magnetic field due to the main field winding.

If low frequency oscillation is developed in the rotor 6, FIG. 1, the voltage regulator damps out these vibrations by suitably exciting the auxiliary field winding.

FIG. 5 illustrates an alternative embodiment of the present invention wherein the auxiliary field winding 48' is located on the outer surface of the torque tube 23 of the rotor 6'. The auxiliary field winding is in thermal communication with the superconductive main field winding 16 and is cooled therewith so that during operation the auxiliary field winding 48' is also at 4.2° K. The auxiliary field winding is fabricated from copper and has a saddle shape design. The auxiliary winding is attached to the torque tube by epoxy impregnated glass fibers and is energized by the low voltage exciter 52, FIG. 1, in the same manner as described above.

The advantage of mounting the auxiliary field winding 48' on the torque tube 23, FIG. 5, is that the winding at 4.2° K. could be operated at higher current density than a winding at room temperature.

FIG. 6 illustrates a second alternative embodiment of the present invention wherein the auxiliary field winding 48" is located on the outside surface of the thermal shield 20 of the rotor 6". The auxiliary field winding 48" is fabricated from copper and is held in place by means similar to that used for the auxiliary winding in FIG. 2. The auxiliary field winding is cooled to a temperature intermediate between ambient temperature and the liquid helium temperature. The advantage of locating the auxiliary winding in this position is the resulting low ohmic loss in the auxiliary winding.

The auxiliary field windings 6', 6" illustrated in FIGS. 5 and 6 are controlled by the voltage regulator 50, FIG. 1, in the same manner as described above. The auxiliary field windings are excited on an intermittent basis to provide rapid changes in the air-gap magnetic flux density between the rotor 6 and the armature 8, FIG. 1, so that the generator can rapidly accommodate changes in the electrical load.

Thus, although the best modes contemplated for carrying out the present invention have been herein shown and described, it will be apparent that modification and variation may be made without departing from what is regarded as the subject matter of the invention.

What is claimed is:

1. Apparatus in a superconductive alternating current electrical machine having both a stator and a rotor, said rotor rotates inside of and with respect to the stator which is stationary, comprising:
   (a) a superconductive main field winding housed in the rotor in the machine for providing a substantially steady-state magnetic field to an armature winding attached to the stator in the machine;
   (b) an auxiliary field winding in the rotor in the machine for providing a transient magnetic field to the armature winding in cooperation with the main field winding, said auxiliary field winding having a substantially shorter time constant than the main field winding;
   (c) means in the rotor for supporting the main field and auxiliary field windings in the machine; and
   (d) voltage regulating means, electrically connected to the main field and auxiliary field windings through low voltage and main exciter means for varying the excitation in the main field and auxiliary field windings, during steady-state load conditions said voltage regulating means exciting only the main field winding, during transient load conditions said voltage regulating means exciting the auxiliary field winding to make up the difference between the magnetic field required by the armature winding to meet the instantaneous load placed on the machine and the magnetic field supplied by the main field winding so that during both steady-state and transient operations the voltage regulation necessitated by the load is provided.

2. Apparatus as in claim 1 in which the rotor contains both the main field and the auxiliary field windings and in which the auxiliary field winding is located on the outer surface thereof.

3. Apparatus as in claim 2 in which the auxiliary field winding is embedded in slots cut into the enterior surface of the rotor and is maintained at ambient temperature during operation of the generator.

4. Apparatus as in claim 1 in which the auxiliary field winding is in thermal communication with the superconductive main field winding for cooling therewith so that during operation the auxiliary field winding is also at liquid helium operating temperature.

5. Apparatus as in claim 1 in which the rotor is cooled by the evaporation of liquid helium and in which the auxiliary field winding is located within the rotor and is cooled to an intermediate temperature between ambient temperature and the temperature of the superconductive main field winding.

6. Apparatus in a superconductive alternating current generator having both a stator and a rotor, said rotor rotates inside of and with respect to the stator which is stationary, comprising:
  (a) a superconductive main field winding in the rotor for providing a substantially steady-state magnetic field to a stationary armature winding in the stator in the alternating current generator;
  (b) an auxiliary field winding in the rotor for providing a transient magnetic field to the armature winding in cooperation with the main field winding, the auxiliary winding having a substantially shorter time constant than the main field winding;
  (c) means in the rotor for supporting the main field and the auxiliary field windings in the generator; and
  (d) voltage regulating means, electrically connected to the main field and the auxiliary field windings through low voltage and main exciter means for varying the excitation in the main field and auxiliary field windings to regulate generator output voltage during steady-state and transient load conditions, during steady-state load conditions said voltage regulating means exciting only the main field winding to provide the voltage regulation necessitated by the load, during transient load conditions said voltage regulating means initially exciting the auxiliary field winding to quickly provide the necessary voltage regulation for the generator while slowly varying the main field winding excitation current to meet the load, said auxiliary field winding being excited to make up the difference between the magnetic field required by the armature and the varying magnetic field supplied by the main field winding.

7. Apparatus as in claim 6 in which the rotor contains both the main field and the auxiliary field windings and in which the auxiliary field winding is located on the outer surface thereof.

8. Apparatus as in claim 6 in which the auxiliary field winding is embedded in slots cut into the exterior surface of the rotor and is maintained at ambient temperature during operation of the generator.

9. Apparatus as in claim 6 in which the auxiliary field winding is in thermal communication with the superconductive main field winding for cooling therewith so that during operation the auxiliary field winding is also at liquid helium operating temperature.

10. Apparatus as in claim 6 in which the rotor is cooled by the evaporation of liquid helium and in which the auxiliary field winding is located within the rotor and is cooled to an intermediate temperature between ambient temperature and the temperature of the superconductive main field winding.

11. Method for regulating the magnetic field provided to an armature of a superconductive electrical machine, comprising the steps of:
  (a) exciting a superconductive main field winding during steady-state load conditions to provide a substantially steady-state magnetic field to an armature winding in the machine;
  (b) exciting initially during transient load conditions an auxiliary field winding in addition to the main field winding in order to quickly provide the voltage regulation necessitated by a transient load condition;
  (c) varying simultaneously during transient load conditions the excitation to the main field winding to provide the voltage regulation necessitated by the transient load condition, said main field winding having a substantially longer time constant than the auxiliary field winding; and
  (d) varying thereafter during transient load conditions the excitation to the auxiliary field winding inversely to the varying exciation to the main field winding so that as the main field winding slowly adjusts to the load condition, the excitation to the auxiliary field winding is correspondingly removed, said auxiliary field winding providing only a fraction of the total excitation and on a transient basis.

12. Method as in claim 11 including the step of:
  (a) exciting the auxiliary field winding to make up the difference between the magnetic field required by the armature winding to meet the instantaneous load placed on the machine and the magnetic field supplied by the main field winding.

13. Method as in claim 11 including the step of:
  (a) damping low frequency oscillations in the rotor of the machine by varying the excitation in the auxiliary field winding.

14. Method as in claim 11 including the step of:
  (a) varying the excitation in the auxiliary field winding to limit the armature terminal voltage during a sudden loss of load.

* * * * *